Figure 5:
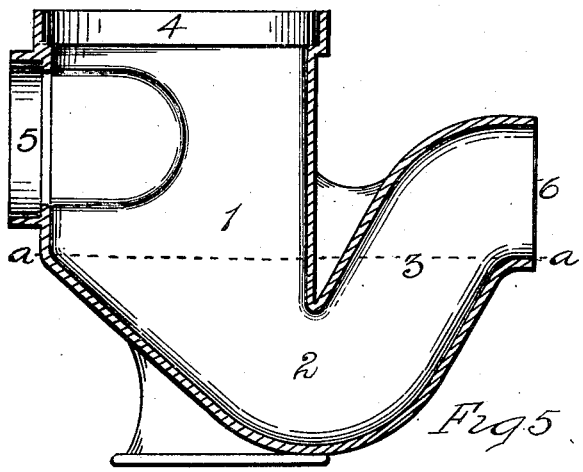

B. OAKES.
SEWER TRAP.
APPLICATION FILED OCT. 19, 1907.
914,066.
Patented Mar. 2, 1909.
3 SHEETS—SHEET 1.
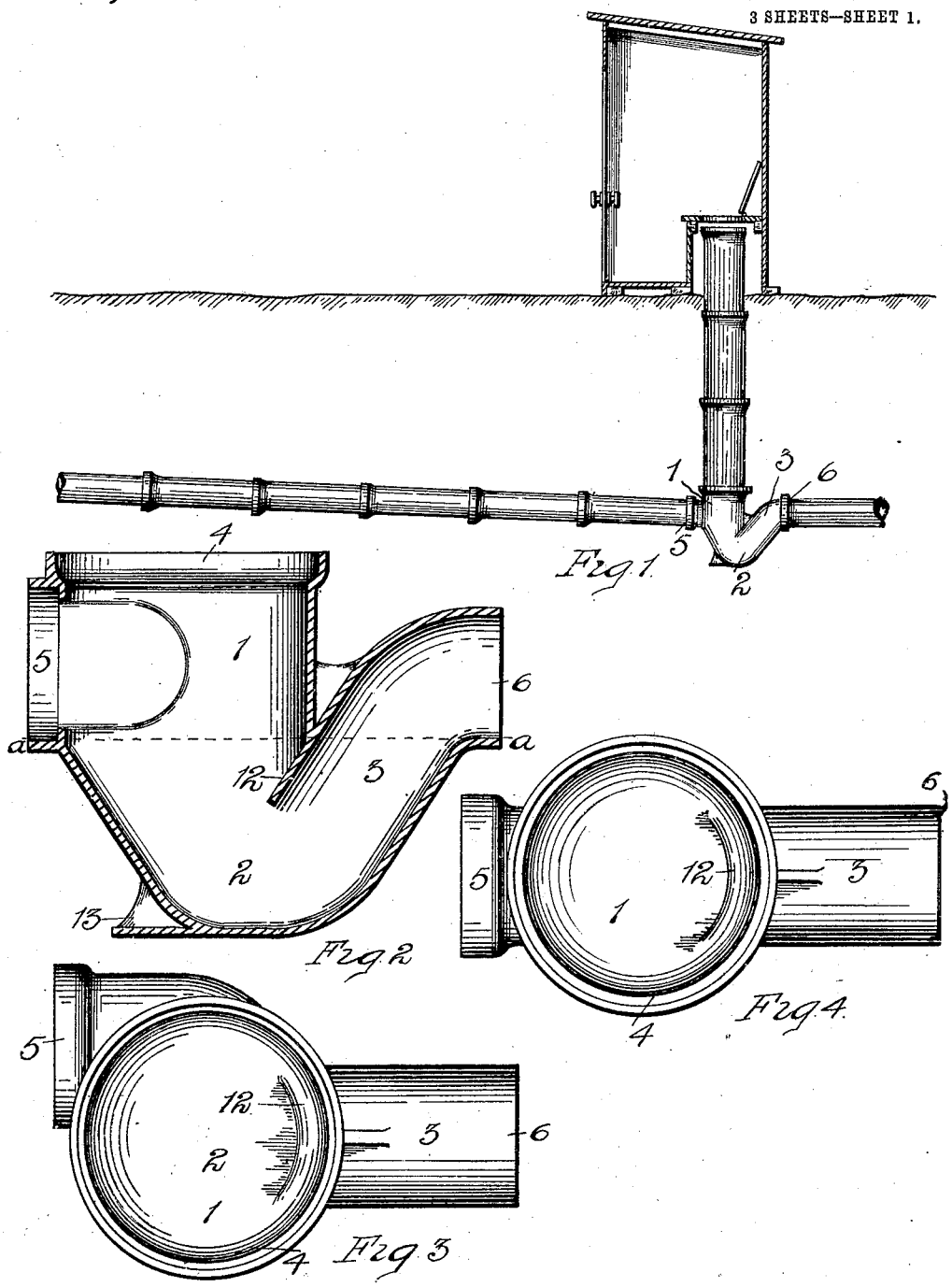
WITNESSES
INVENTOR
Ben Oakes
By Parker & Burton, Attorneys.

B. OAKES.
SEWER TRAP.
APPLICATION FILED OCT. 19, 1907.

914,066.

Patented Mar. 2, 1909.
3 SHEETS—SHEET 2.

WITNESSES
C. E. Day.
C. C. Jennings

INVENTOR
Ben Oakes.

By
Parker & Burton Attorneys.

THE NORRIS PETERS CO., WASHINGTON, D. C.

B. OAKES.
SEWER TRAP.
APPLICATION FILED OCT. 19, 1907.

914,066.

Patented Mar. 2, 1909.
3 SHEETS—SHEET 3.

WITNESSES
C. E. Day
C. C. Jennings

INVENTOR
Ben Oakes

By Parker & Burton Attorneys.

THE NORRIS PETERS CO., WASHINGTON, D. C.

UNITED STATES PATENT OFFICE.

BEN OAKES, OF DETROIT, MICHIGAN.

SEWER-TRAP.

No. 914,066.  Specification of Letters Patent.  Patented March 2, 1909.

Application filed October 19, 1907. Serial No. 398,295.

*To all whom it may concern:*

Be it known that I, BEN OAKES, a citizen of the United States, residing at Detroit, county of Wayne, State of Michigan, have invented a certain new and useful Improvement in Sewer-Traps, and declare the following to be a full, clear, and exact description of the same, such as will enable others skilled in the art to which it pertains to make and use the same, reference being had to the accompanying drawings, which form a part of this specification.

This invention relates to a sewer pipe fitting comprising a combined sewer trap and closet bowl.

It has for its object a sewer trap adapted to be sunk to the sewer line, and provided with an enlarged inlet conduit which is extended to the ground or above the ground line with provision for constantly retaining in the trap a sealing liquid to prevent the passage of air from the main sewer into house drainage pipes, and of the inflow thereinto of flushing liquid which completely flushes out and changes the sealing liquid.

The trap with its connections thus forms an out-door closet with a bowl having a large water surface exposed where soil enters and which will always keep itself flushed and clean by means of the passage therethrough of the roof water or sink water from the house, or water running through the sewer part of the structure from any other source.

The structure in which the invention is embodied consists of a wide bowl mouthed trap structure, having at its bottom an exit much narrower than the breadth of the bowl, and having a return bend rising from the bottom to form a trap, and having an inlet thereinto for flush water, which is above the water containing part and is so located with reference to the water containing part that the entrance of the flush water into the bowl produces a rotary movement of the water in the bowl at positively the same velocity as is obtained through the inlet flush pipe, and such movement of the water tends to drive any material, either of higher or lower specific gravity than the water to the center of the circling water, whence it passes through the diaphragm and the bend of the trap into the sewer pipe beyond the trap. The bottom part of the trap is made entirely without corners or parts upon which any solid or semi-solid matter can stop or accumulate.

Figure 6:
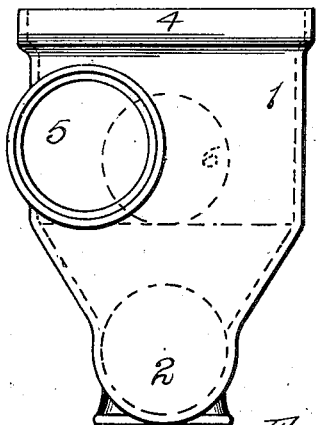
Figure 7:
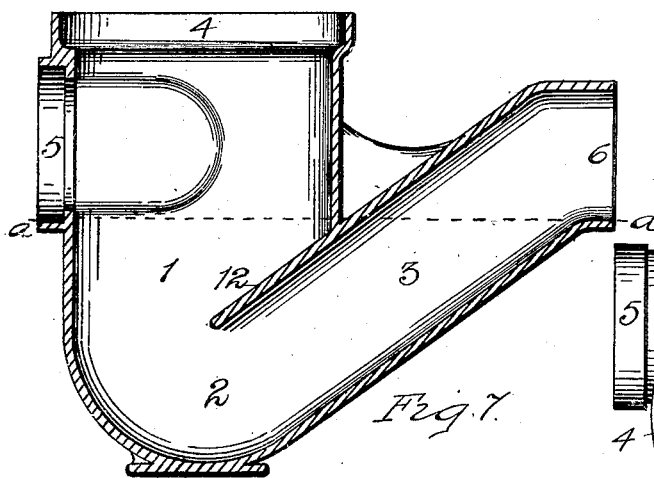
Figure 8:
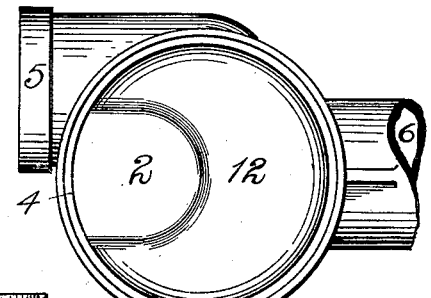
Figure 9:
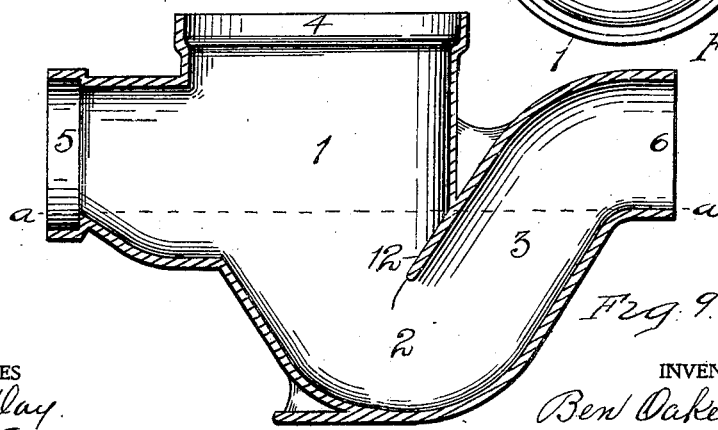
Figure 10:
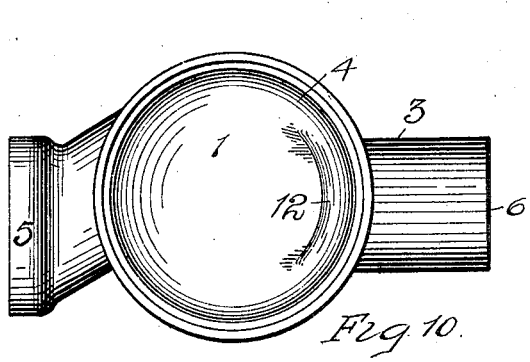
Figure 11:
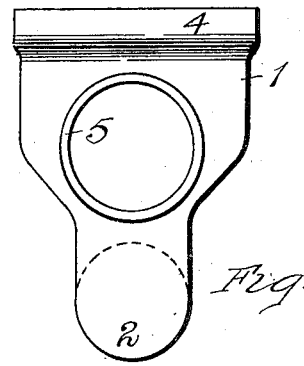
Figure 12:
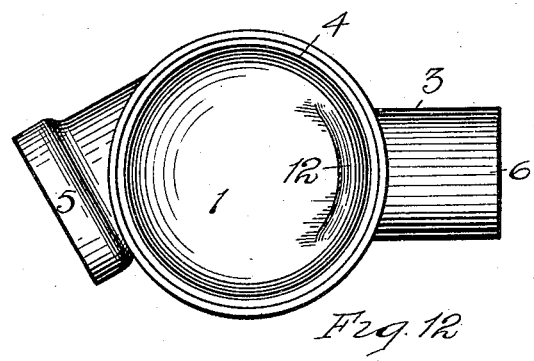
Figure 13:
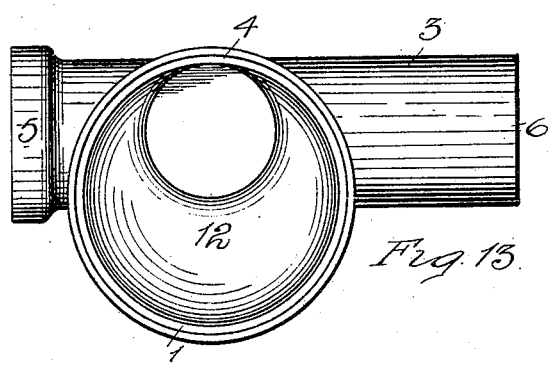

In the drawings:—Figure 1, shows the general arrangement of the trap and its connection with the sewer and inlet pipe. Fig. 2, is a vertical longitudinal section through the trap. Fig. 3, is a plan view. Fig. 4, is a plan view of the trap with the entrance directly opposite the exit pipe. Fig. 5, is a vertical longitudinal section of a trap having a different shape at the reduced throat part. Fig. 6, is an end elevation of the trap shown in Figs. 2, 7 and 5. Fig. 7, is a vertical longitudinal section of a trap similar to, but slightly different in construction from that shown in Fig. 2. Fig. 8, is a plan view of the bowl shown in Fig. 7. Fig. 9, is a vertical longitudinal section of a bowl having an enlarged sewer pipe inlet. Fig. 10, shows the flush pipe entering at an angle. Fig. 11, shows a variation in the place of reducing from large to small diameter. Fig. 12, shows another form of trap with flush pipe entering at an angle. Fig. 13, is a plan view of a trap having both inlet and outlet at one side of the axis of the vertical pipe.

The trap has a bowl part 1, a trap part 2, a return bend 3, an inlet opening for a vertical soil pipe 4, an opening 5, for a horizontal inlet pipe, an outlet opening 6, a water seal 12 and a base 13.

The inlet opening 5, is at one side of the center line through the bowl and enters somewhat tangentially to the circumference of the bowl. The entrance opening may occupy substantially one-quarter of a circumference or less, and is located preferably above that portion of the trap which will be occupied by standing water when the trap is in use.

Below the inlet opening 5, and the line *a, a*, (the normal surface line of contained water), the bowl diminishes by contracting the outer walls as shown in Figs. 2, 5, 7 and 9, or by placing a sealing diaphragm or partition 12, between the bowl and the outlet, contracting the bowl on the side nearest to the outlet, as shown in Figs. 2, 7 and 9; or by placing a diaphragm contracting the bowl, as shown in Figs. 2, 7 and 9; or by both contracting the walls and introducing the diaphragm, as shown in Figs. 2 and 9. In either case, the bowl contracts below the inlet opening for flush water, causing the water to have an accelerated motion as it passes this narrow or more contracted part of the passage. Preferably, the inlet opening is tangential, as described, for the purpose of producing the circular or rotary motion of the water in the bowl as it passes down and through the contracted opening. A whirling or rolling of the water may be given to it however, by expanding the inlet opening of the flush water inlet downward, giving to the incoming water a sudden fall, near to the surface at which the water stands normally in the bowl, which will cause a rolling or horizontal circulating motion of the water at times when, because of the rapid in-rush of the water, it accumulates in the bowl above the normal surface. Such a construction is shown in Fig. 9.

The trap has a large body of water in its seal above the diaphragm with a large area on its normal water level in the bowl; yet the velocity of the water in the bowl is substantially the same as it is through the sewer, and the outlet side of the trap affords little resistance to the downward flow of water through the bowl and diaphragm, and does not materially affect the flow of sewage.

The trap is accessible for clean-out purposes in case of stoppage.

What I claim is:—

1. A sewer trap, having in combination an upwardly opening bowl whose walls are substantially perpendicular from the top edge to the normal low water line therein, a tangentially entering inlet portion on one side thereof, the bottom thereof being above the normal low water line in the lower portion of the bowl, a water seal portion depending below the low water line of the bowl from that portion of the wall opposite to the inlet portion, and a return bend with the opening from the inlet and from the lower portion of the bowl contracting thereinto, the outlet end of the return bend being at a lower level than the inlet, substantially as described.

2. A unitary trap, having in combination a body portion open at the top for connection with a vertical inlet pipe, being of uniform cross-sectional size therewith to a point below the normal low water line, an inlet pipe for flush water entering through the side wall above said water line, and a return bend of smaller diameter than said body portion and to which the same tapers, the discharge terminal of said return bend being lower than the inlet pipe, substantially as described.

3. In a combined sewer trap and closet bowl, the combination of a bowl having an open top whose side walls above the normal low water line therein are vertical, a return bend portion to which the bowl contracts and with which it coöperates in maintaining a stored supply of water within the trap, a flush water inlet opening through said vertical wall portion above the normal low water line, whereby a tangential flow of water may be directed into the bowl, and a water seal-portion depending into the water stored in the bowl intermediate the inlet and outlet portions, substantially as described.

4. A combined sewer trap and closet bowl, comprising a bowl having walls which incline outwardly from the bottom to the normal low water line therein and thereafter rise vertically to the open top portion, a horizontal inlet portion whose axis is tangential to the periphery of the bowl, adapted to direct a flow of water thereinto from a point above said water line, a water seal depending from the side opposite to the inlet portion into the water stored in the bowl, and an integral return bend portion of smaller diameter than said bowl, through which the contents of the bowl entering through either aperture therein are discharged by the flow of flush water admitted through said horizontal inlet portion, substantially as described.

5. In a combined sewer trap and out door closet, the combination of a sewer trap bowl having an open top and vertical walls adjacent thereto of the same diametrical extent as the top, said walls reaching below the normal water line, an inlet portion through said walls adapted to conduct a supply of flush water thereinto above the water line, a water seal extending into the water from a point nearly opposite that at which said inlet portion enters, and a return bend of smaller diameter than said vertical walled portion, to which the same tapers, the outlet end thereof being lower than said inlet portion, substantially as described.

6. A sewer trap, having as its characteristic features a receiving portion having an open top, the walls rising vertically from a point in the bowl portion below the normal low water line, an inlet portion tangentially arranged with respect to the periphery of the bowl, adapted to discharge water thereinto above the normal low water line in a way to cause a swirling movement of the same within the bowl, a seal portion extending below the normal low water line, and a return bend portion partially spaced from the main bowl portion by the seal, to which the walls constituting the bowl portion and the seal taper, its outlet end being located below the level of the inlet portion, substantially as described.

In testimony whereof, I, sign this specification in the presence of two witnesses.

BEN OAKES.

Witnesses:
CHARLES F. BURTON,
MAY E. KOTT.